Sept. 13, 1927. 1,642,261
F. PATTERSON
WEEDER
Filed Sept. 25, 1926 2 Sheets-Sheet 1

Inventor
F. Patterson.
By Horace C. Chandler
Attorney

Sept. 13, 1927.　　　　　F. PATTERSON　　　　　1,642,261
WEEDER
Filed Sept. 25, 1926　　　2 Sheets-Sheet 2
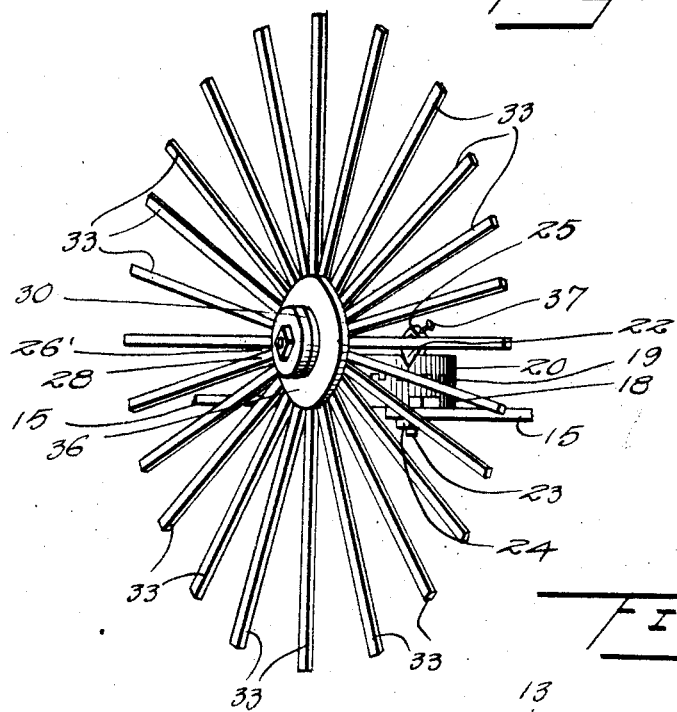
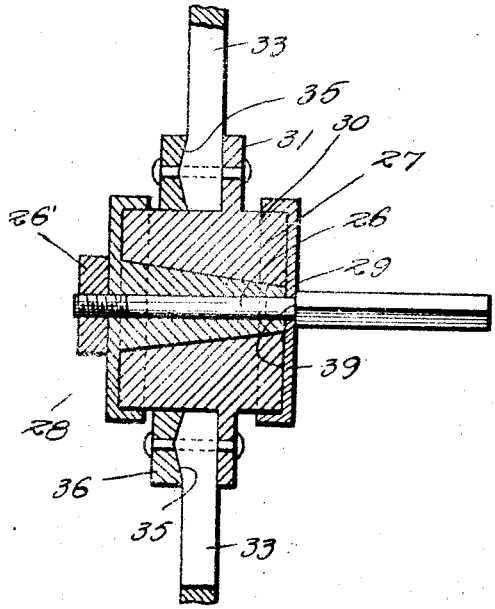
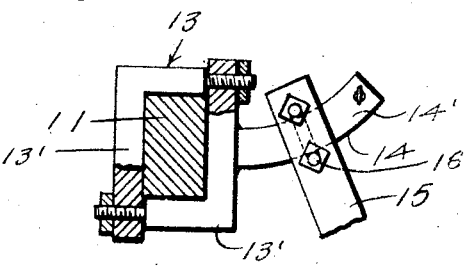
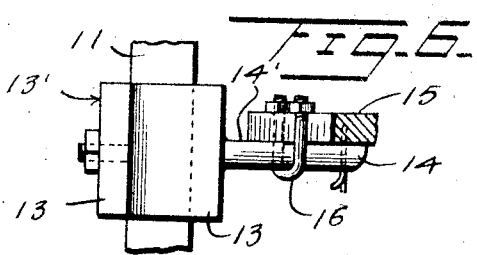
Inventor
F. Patterson
By Horace C. Chandler
Attorney Patented Sept. 13, 1927.

1,642,261

UNITED STATES PATENT OFFICE.

FRANK PATTERSON, OF RICHFIELD SPRINGS, NEW YORK.

WEEDER.

Application filed September 25, 1926. Serial No. 137,794.

This invention relates to new and useful improvements in agricultural machines, and particularly to cultivators.

The principal object of the invention is to provide a novel and improved form of weeder which is adapted to be connected with the ordinary cultivator.

Another object is to provide a device of this character which is adapted to dig out the weeds between the plants of a row, while at the same time, the regular cultivator shovels stir the soil at the sides of the row, such action of the weeder being performed without injury to the standing plants.

Other objects and advantages will be apparent from the following description when taken in connection with the accompanying drawings.

In the drawings:

Figure 2 is a rear elevation of the same.

Figure 3 is an enlarged view showing the manner of connecting the draw bars to the tooth bars of the cultivator.

Figure 4 is an enlarged longitudinal sectional view through the weeder wheel and the hub thereof.

Figure 6 is a top plan view of the clamp shown in Figure 3.

Figure 1:
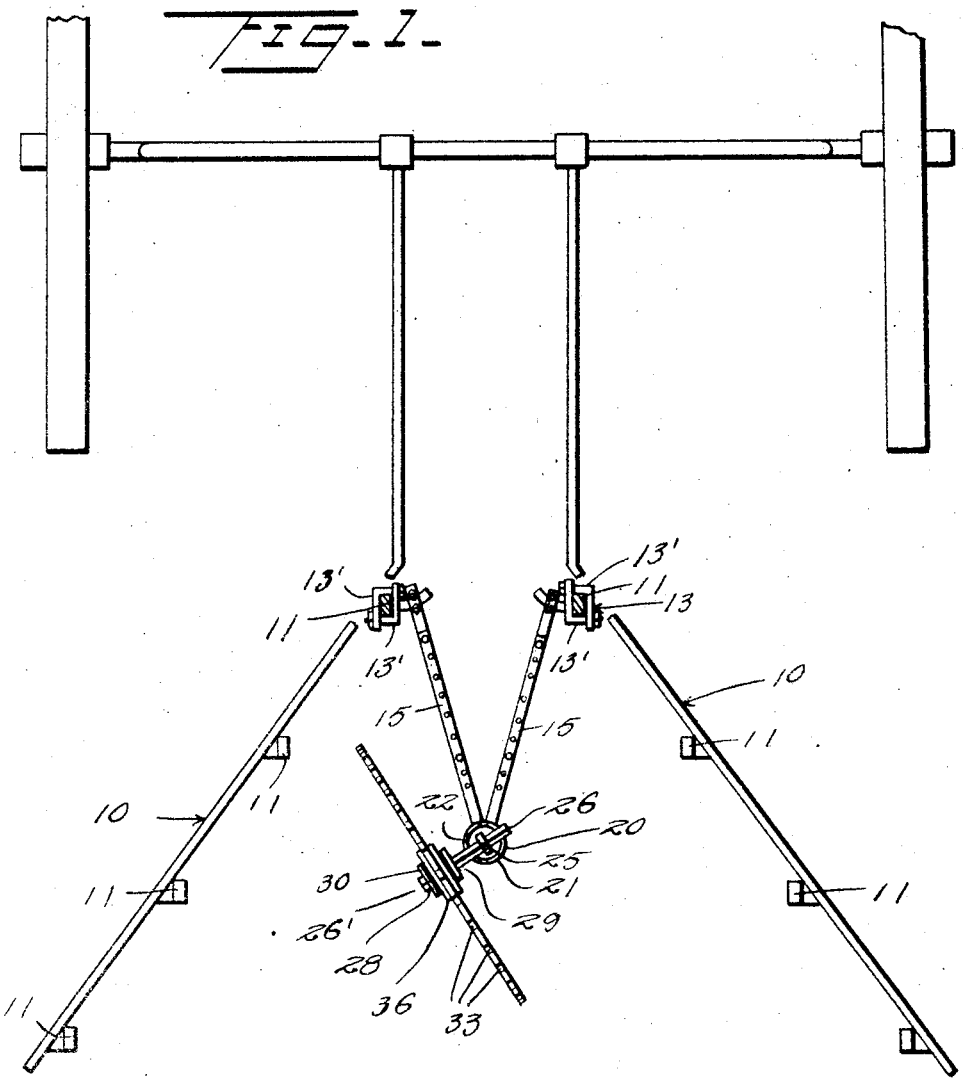
Figure 1 is a top plan view of a portion of a cultivator, showing the invention applied thereto.
Figure 5:
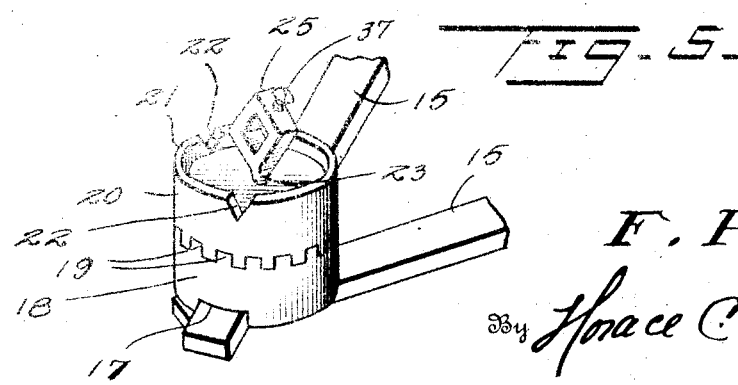
Figure 5 is a perspective view of the rear connected ends of the draw bars, showing the manner of mounting the axle of the weeder wheel thereof, and the means for accomplishing the adjustments of the wheel.

Referring particularly to the accompanying drawings, 10 represents the tooth bars of a cultivator of the straddle row type, each bar having the stems 11, of the cultivator shovels 12 properly clamped thereon.

Properly embracing each of the foremost of the shovel stems 11 is a two-piece clamp 13, having a lateral arcuate lug 14, which is formed with a flat portion 14'. Engaged on this flat portion 14', is one end of a bar 15, said bar having openings receiving the legs of a U-bolt 16, which is engaged around said lug, and having nuts on said legs, whereby to firmly clamp the bar end on the lug. The other ends of the bars 15 are disposed in superimposed relation, and provided with registering openings. Disposed on the upper bar 15, over the apertured end, and provided with a transverse groove 17, receiving a portion of said bar end, is a disk 18, also having a central opening registering with the openings of the bars. The upper face of the disk is provided with radial ribs and grooves 19, with which are meshed the ribs and grooves of a second disk 20, disposed on the disk 18. This upper disk 20 is formed with a vertical peripheral flange 21, and in this flange are the series of notches 22, said upper disk being thinner at one side than at the other. Disposed through the registering openings of the bars 15, and the disks 18 and 20, is a threaded stem 23, the lower end of which carries a nut 24, while the upper end is formed with an angular eye 25, for a purpose which will now be described. A shaft 26 is formed with an angular end portion which is disposed through the eye 25, while the remainder of the shaft, which is circular in cross section, is disposed through an axle skein 27. A washer plate 28, having a peripheral flange embracing the larger end of the skein, is disposed on the said shaft, beneath the nut 26', thereof, as clearly seen in the sectional view Figure 4. A similar washer plate 29 is engaged on the other or smaller end of the skein, and has a flange embracing said end of the skein, and a central opening receiving the shaft therethrough. Rotatably supported on the skein is the hub 30, which has a peripheral flange 31, in one side face of which are formed the radially extending grooves 32, and disposed in each of these grooves is a radially extending spoke 33. The outer side of the inner end of each of the spokes is formed with an enlargement 34, which is received in the circular groove 35 formed in the face of the retaining disk 36, said disk being slipped onto the hub, and held in spoke clamping position by bolts of rivets passed therethrough and through the flange of the hub.

It will be noted that the clamp 13 comprises two L-shaped members 13', each of which has an opening in one end for the reception of the threaded end of the other member, a nut 15' being engaged thereon, whereby said clamp is capable of properly embracing posts of different sizes.

By means of the disks 18 and 20, and the clamping member 23, the wheel, including the hub 30 and spokes 33, may be swung in a horizontal plane, whereby to dispose the same at different angles with respect to the line of draft of the cultivator. The wheel is mounted to lie between the gangs of cultivator teeth or shovels, and to operate transversely of the row of plants, and being disposed obliquely with respect to the line of draft, will rotate as the cultivator proceeds, to dig out the weeds which have grown up between the plants of the row. This action of the wheel will also stir up the soil close to the plants, at points not reached by the cultivator shovels. It will also be noted that, by means of the axle or shaft of the wheel, and the beveled or inclined upper disk 20, with its notched flange which receives the adjacent portion of the shaft, the angle of the wheel with respect to a vertical plane, may be varied, and thereby regulate the depth to which the spokes of the wheel will dig into the soil. Also, this action of the weeder wheel serves to properly mulch the plants.

The eye 25 is provided with a set screw 37 which is arranged to engage the square portion of the shaft 26, to hold the same in different adjusted positions therethrough. The said square portion of the shaft is of greater diameter than the cylindrical portion whereby to form a shoulder 39, for engagement with the washer plate 29.

It will be noted that the lugs 14 are arcuate whereby to permit the bars 15 to properly engage therewith, regardless of the angle at which they extend with relation to each other. The outer ends of the lugs 14 are apertured to receive the cotter pins 38.

What is claimed is:

A weeder attachment for a cultivator comprising a pair of rearwardly converging bars, clamps for engagement on certain of the shovel standards of the cultivator and each having a lug projecting from one side thereof, the forward end of each of the said bars being clamped on a lug; a disk arranged on the converged ends of the said bars, a second disk rotatably adjustable on the first disk, said second disk having a notched flange on its upper portion, a bolt disposed vertically through the disks and said converged ends of the bars, a nut engaged on the bolt beneath the bars, the upper end of the bolt having an angular eye, an angular shaft disposed through said eye and resting in a notch of the upper disk, and a weeder wheel rotatably mounted on said shaft.

In testimony whereof, I affix my signature.

FRANK PATTERSON.